United States Patent Office 3,155,663
Patented Nov. 3, 1964

3,155,663
AMINOPYRAZINES
Wilson B. Lutz, Florham Park, and Robert I. Meltzer, Rockaway, N.J., assignors to Warner-Lambert Pharmaceutical Company, Morris Plains, N.J., a corporation of Delaware
No Drawing. Filed Nov. 15, 1962, Ser. No. 238,050
6 Claims. (Cl. 260—250)

The present invention relates to new and novel substituted pyrazine derivatives of the formula:

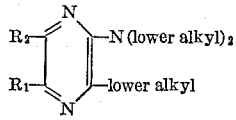

wherein the lower alkyl substituent may be methyl, ethyl or propyl, $R_1$ may be halogen such as chlorine or bromine, hydroxy, or alkoxy such as methoxy or ethoxy, di-lower alkyl-amino such as dimethylamino or diethylamino and $R_2$ may be hydrogen or lower alkyl.

This invention also relates to the pharmaceutically acceptable nontoxic acid addition salts of these substituted pyrazine compounds.

Exemplary of the new and novel compounds of this invention are 2 - dimethylamino - 5 - chloro - 3,6 - dimethylpyrazine, 2,5 - bis(dimethylamino) - 2,6 - dimethylpyrazine, 2 - dimethylamino - 5 - methoxy - 3,6 - dimethylpyrazine, 2 - dimethylamino - 5 - hydroxy - 3,6 - dimethylpyrazine, 2 - dimethylamino - 5 - chloro - 3 - methylpyrazine and the like.

The compounds above are valuable intermediates useful in the preparation of other pyrazine derivatives. In addition, they possess significant biological activity through their activity on the central nervous system and are thus useful as tranquilizers, muscle relaxants and sedatives. They also exhibit antimicrobial activity.

Certain of the novel compounds of this invention are obtained by reacting a starting compound of the formula:

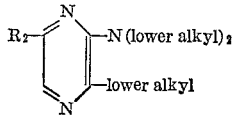

wherein the substituents $R_2$ and lower alkyl have the significance above, with a halogen. Exemplary of this starting compounds are 2-dimethylamino-3,6-dimethylpyrazine, 2-dimethylamino-3,6-diethylpyrazine and the like.

The halogenation reaction may be effected, for example, by bubbling gaseous chlorine at a moderate rate into a solution of the 2-di-lower alkyl-amino-3,6-di-lower alkyl pyrazine in chloroform at ambient temperature until the chlorination is complete. This normally requires about 20 to 30 minutes. The reaction product, 2-di-lower alkyl-amino-5-chloro-3,6-di-lower alkyl pyrazine hydrochloride is recovered from the reaction mixture by extraction. The free base is readily obtained by treating the hydrochloride with a base. The 2-di-lower alkyl-amino-5-chloro-3,6-di-lower alkyl pyrazine is sufficiently reactive to undergo further reaction. Thus, for example, it reacts with liquid dimethylamine at about 200° C. to form 2,5-bis(di-lower alkyl-amino)-3,6-di-lower alkyl pyrazine or it reacts with sodium methoxide at about 125° C. to form 2-di-lower alkyl-amino-5-methoxy-3,6-di-lower alkyl pyrazine. The latter, in turn, may be demethylated to give 2-di-lower alkyl-amino-5-hydroxy-3,6-lower alkyl pyrazine.

The compounds of this invention may be converted into their pharmaceutically acceptable nontoxic acid addition salts by conventional salt forming procedure. Typical salts are those formed with organic acids such as maleic, fumaric, succinic and citric acid and inorganic acids such as sulfuric, hydrochloric, hydrobromic and nitric acid, for example.

For therapeutic use the compounds of this invention, either as the free base or in the form of a salt, may be incorporated into inert pharmaceutical diluents and carriers to provide such dosage forms as tablets, capsules, solutions, suspensions, suppositories and the like.

The following examples are included in order further to illustrate the invention.

EXAMPLE I

2-Dimethylamino-5-Chloro-3,6-Dimethylpyrazine Hydrochloride

Gaseous chlorine is bubbled into a stirred solution of 15.1 g. 2-dimethylamino-3,6-dimethylpyrazine in 200 ml. chloroform at a moderate rate for a total of one-half hour. At the end of this period the chloroform is removed and 150 ml. of ether are added to obtain 2-dimethylamino-5-chloro-3,6-dimethylpyrazine hydrochloride as a light yellow hygroscopic solid. Recrystallization is effected by dissolving the solid in 150 ml. of hot acetonitrile and adding ether until turbid. Crystals quickly separate and are filtered and washed with 1:1 acetonitrile-ether. The product obtained on recrystallization melts at 155°–157° C.

EXAMPLE II

2,5-Bis(Dimethylamino)-3,6-Dimethylpyrazine Dihydrochloride

A mixture of 11.1 g. of 2-dimethylamino-5-chloro-3,6-dimethylpyrazine and 50 ml. of liquid dimethylamine are heated in a steel bomb for 18 hours at 200° C. After the solvent is removed the oily residue is treated with 50 ml. water and 100 ml. of 50% potassium carbonate solution and extracted with 800 ml. of ether. The ethereal solution is filtered and the ether evaporated to give 2,5-bis(dimethylamino)-3,6-dimethylpyrazine as a light yellow oil. This is dissolved in 35 ml. of 2-propanol and treated with dry hydrogen chloride to obtain a light yellow solid which after being washed with 2-propanol and ether gives a white solid, M.P. 173°–175° C. Recrystallization from ethanol-ether gives analytically pure material, M.P. 176°–178° C.

EXAMPLE III

2-Dimethylamino-5-Methoxy-3,6-Dimethylpyrazine Hydrochloride

A solution of 0.06 mole of sodium methoxide and 5.55 g. of 2-dimethylamino-5-chloro-3,6-dimethylpyrazine in 50 ml. of methanol is heated in a carius tube at 125° C. for 18 hours. Sodium chloride is removed by filtration and the solvent removed on a rotary evaporator. 100 g. of water is added and the separated oil extracted into 250 ml. ether. The yellow-green ethereal solution is treated with dry hydrogen chloride to give 2-dimethylamino-5-methoxy-3,6-dimethylpyrazine hydrochloride as a yellow-partly crystalline solid. This is filtered and washed with 20 ml. ether to give a hygroscopic solid. Recrystallization from 25 ml. of hot ethyl acetate gives light yellow crystals melting at 128° C. with bubbling and resolidification and remelting at 232°–234° C. Further recrystallization from ethyl acetate gives a product which melts at 154°–156° C. and resolidifies and remelts at 232°–234° C.

EXAMPLE IV

2-Dimethylamino-5-Hydroxy-3,6-Dimethylpyrazine Hydrochloride

A solution of 8.0 g. 2-dimethylamino-5-methoxy-3,6-dimethylpyrazine hydrochloride in 100 ml. of concentrated hydrochloric acid is maintained at reflux temperature for three hours and evaporated to dryness on a rotary evaporator. The remaining crude brown solid is sublimed at 140° C. (0.1 mm.) to give 2-dimethylamino-5-hydroxy-3,6-dimethylpyrazine hydrochloride as an orange sublimate, M.P. 225°–230° C. Recrystallization from 100 ml. of ethyl acetate gives a light orange solid, M.P. 235°–240° C.

It is understood that the foregoing detailed description is given merely by way of illustration and that many variations may be made therein without departing from the spirit of our invention.

Having described our invention, what we desire to secure by Letters Patent is:

1. A compound selected from the group consisting of those having the formula

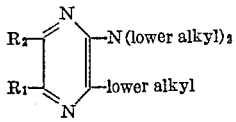

wherein $R_1$ is a member selected from the group consisting of dilower alkyl-amino, hydroxy, bromine chlorine methoxy and ethoxy and $R_2$ is a member selected from the group consisting of hydrogen and lower alkyl and the pharmaceutically acceptable nontoxic acid addition salts thereof.

2. 2-dimethylamino-5-chloro-3,6-dimethylpyrazine hydrochloride.

3. 2,5-bis(dimethylamino)-3,6-dimethylpyrazine dihydrochloride.

4. 2-dimethylamino - 5 - methoxy-3,6-dimethylpyrazine hydrochloride.

5. 2-dimethylamino - 5 - hydroxy-3,6-dimethylpyrazine hydrochloride.

6. 2-dimethylamino-5-chloro-3-methylpyrazine.

No references cited.